United States Patent
Groblebe

[15] 3,652,059
[45] Mar. 28, 1972

[54] TIRE PUNCTURING DEVICE TO IMPEDE MOVEMENT OF A VEHICLE

[72] Inventor: Earl E. Groblebe, 1600 Sable Boulevard, #142, Aurora, Colo. 80010

[22] Filed: July 17, 1970

[21] Appl. No.: 55,688

[52] U.S. Cl. ..................................................256/1
[51] Int. Cl. ........................................E01f 13/00
[58] Field of Search ..........................256/1, 11, 12; 94/1, 1.5; 52/101

[56] References Cited

UNITED STATES PATENTS

| | | | |
|---|---|---|---|
| 3,456,920 | 7/1969 | Elvington | 256/1 |
| 2,346,713 | 4/1944 | Walker | 256/1 |
| 2,353,386 | 7/1944 | Bourcier | 256/1 |
| 2,912,229 | 11/1959 | Persgard | 256/1 |

FOREIGN PATENTS OR APPLICATIONS

| | | | |
|---|---|---|---|
| 322,224 | 12/1929 | Great Britain | 256/1 |
| 206,470 | 8/1966 | Sweden | 256/1 |

*Primary Examiner*—Dennis L. Taylor
*Attorney*—Anderson, Spangler & Wymore

[57] ABSTRACT

A plurality of hollow, sharpened, nail-like members are releasably secured in spaced relation along the length and width of an elongated strip to be extended across a roadway to puncture one or more pneumatic tires of a vehicle to provide controlled deflation of the tires and to impede the movement of the vehicle to assist law enforcement officials in the capture of the vehicle and occupants with a minimum of personal risk.

3 Claims, 7 Drawing Figures

PATENTED MAR 28 1972 3,652,059
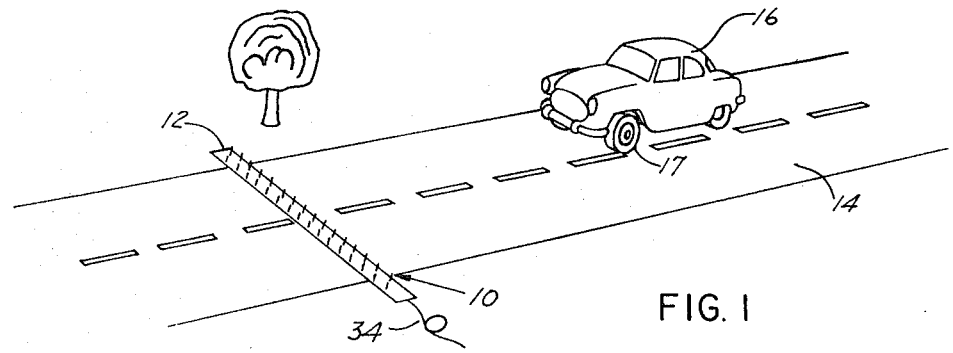
FIG. I
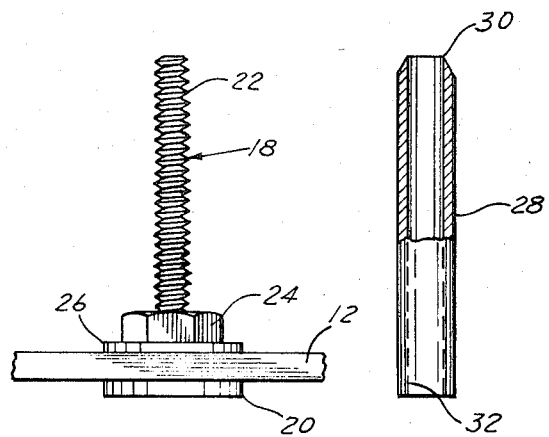
FIG. 2    FIG. 3    FIG. 4
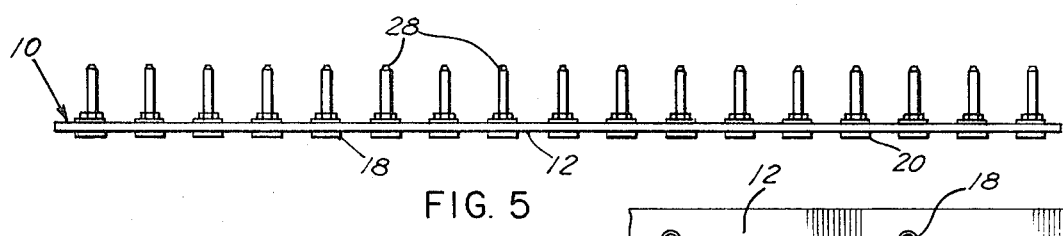
FIG. 5
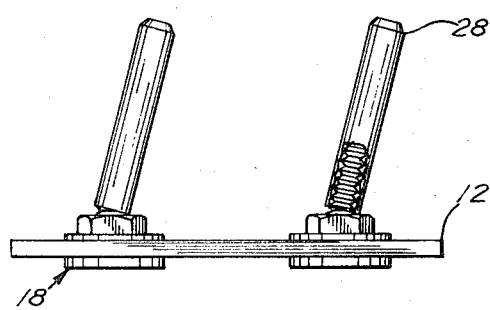
FIG. 6
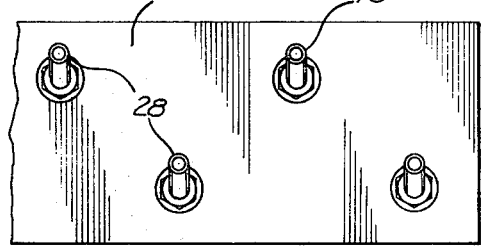
FIG. 7
INVENTOR
EARL E. GROBLEBE
BY
Anderson, Spangler & Wymore
ATTORNEYS

TIRE PUNCTURING DEVICE TO IMPEDE MOVEMENT OF A VEHICLE

The invention comprises an elongated strip of material which has a plurality of hollow, sharpened, nail-like members detachably secured thereto by suitable means, which sharpened, hollow, nail-like members serve as puncturing spikes for pneumatic tires to aid in the capture of vehicles and occupants thereof by law enforcement officials. The hollow, sharpened, nail-like members are spaced sufficiently close and staggered in a zig-zag pattern along the length of the strip so that one or more of the hollow puncturing members will penetrate one or more pneumatic tires and deflate same within a short time without a blowout.

This invention relates to improvements in vehicle impeding devices and more particularly to such a device adapted to puncture one or more pneumatic tires of a vehicle, to deflate same and bring the vehicle to a controlled halt without the danger of a blowout.

Vehicle impeding devices have been proposed before but in most cases lacked convenience of use, were not reusable or were difficult to install and operate under adverse conditions of law enforcement.

The present invention is so constructed as to provide ease of handling being in the form of an elongated strip which can be folded or reeled for ease of transportation.

The present device is provided with replaceable and reusable hollow, sharpened, nail-like elements, which can be conveniently replaced for ease of maintenance and reuse.

The present device can be pulled across a roadway by means of a rope or line for selectively impeding a particular vehicle or it can be installed across a roadway to impede all traffic. Where the device is wound onto a reel, which may be spring-loaded, the device may be drawn across the roadway at selected times and allowed to retract at all other times. Such an arrangement can be operated by a single operator or the strip could be reeled in by a second operator at the reel where the reel is not spring-loaded to rewind the strip.

When a fleeing vehicle approaches the place where the vehicle impeding device is to be strung across the roadway, the elongated strip may be pulled thereacross at a time when the operator will have no opportunity to steer the vehicle to avoid the crossing of the vehicle impeding strip whereupon one or more of the sharpened, hollow, nail-like elements will pierce one or more of the vehicle's tires causing a controlled complete leakage of air therefrom forcing the driver of the vehicle to slow down and stop.

An important object of this invention is to provide an improved vehicle impeding device which will position hollow, sharpened, nail-like elements to enter the casing of a pneumatic tire as it rolls over the device to release the air pressure from the tire in a controlled manner.

A further important object of the invention is to provide an improved vehicle impeding device having detachable, hollow, sharpened, nail-like elements which can be replaced after use without having to discard the entire device.

Another object of the invention is to position the hollow, sharpened, nail-like elements to insure their puncturing a pneumatic tire which rolls thereover.

Another object of the invention is to provide an improved vehicle impeding device to deflate the pneumatic tires of a vehicle which device is simple of construction, easily transportable, simple to use, effective and positive of action.

For a better understanding of the present invention, together with other and further objects thereof, reference is had to the following description taken in connection with the accompanying drawing and its scope will be pointed out in the appended claims.

In the drawings:

FIG. 1 is a perspective view showing a roadway, a vehicle, and showing a vehicle impeding device across the roadway;

FIG. 2 is a side view of a single bolt for supporting a hollow, sharpened, nail-like element of the device;

FIG. 3 is a view of the hollow, sharpened, nail-like element supported by the bolt attached to the device;

FIG. 4 is a view of a tire casing with portions broken away showing a hollow, sharpened, nail-like element piercing the casing after passing over the vehicle impeding device;

FIG. 5 is a side view of the elongated vehicle impeding device;

FIG. 6 is an end view of the device shown in the preferred form where the bolts or rivets supporting the hollow, sharpened, nail-like elements are slanted toward the oncoming traffic; and, FIG. 7 is a plan view of a portion of the vehicle impeding device showing the hollow, sharpened, nail-like elements being positioned in a staggered zig-zag relation.

Referring now to the drawings the vehicle impeding device generally identified by the reference numeral 10 is seen to comprise an elongated strip 12 which may be a belt made of fabric, and/or elastomer, and the like. The device 10 is placed across a roadway 14 having a pneumatically-tired vehicle 16 with tires 17 approaching the vehicle impeding device. The elongated strip 12 has a plurality of bolts or rivets 18 passing therethrough with the head 20 of the bolt or rivet 18 to one side of the strip or belt 12 and a portion of the bolt or rivet body 22 projecting from the other side of the strip 12. A nut 24 secures the bolt 18 to the strip and suitable washers 26 may be placed beneath the head 20 and nut 24 to stabilize the body 22 with the strip 12. The rivets or bolts 18 are positioned in spaced relation along the length of the strip 12 and staggered in zig-zag relation. In the preferred embodiment the bodies 22 of the bolts or rivets are slanted to one side toward the oncoming traffic as shown in FIG. 6 in order to insure entry into the tire casing.

The detachable elements 28 are seen to comprise a length of tubing preferably of metal or other suitable material which can be provided with a sharpened edge 30 on one end. The elements 28 are positioned over the bolt or rivet body 22 protruding from the one side of the belt. The elements are either slightly crimped onto the bolt or rivet body 22 or the internal diameter 32 of the tubing is selected to provide a slip fit over the bolt or rivet body 22 to secure element 28 from being dislodged in handling.

Thus as the pneumatic tire 27 of a vehicle passes over the device one or more of the detachable elements 28 pass through the casing of the tire and detaches from the bolt or rivet body 22 remaining in the casing and provides a controlled escape of the air under pressure within the tire. The bolt or rivet bodies 22 from which the elements 28 have been detached are then supplied with new elements to maintain the strip filled with tire puncturing elements.

It is contemplated that the device will be provided with a line 34 attached at either or both ends of the device 10 so that the device can be pulled across the roadway in front of an oncoming car to be stopped.

While there have been described what at present are considered to be the preferred embodiments of this invention, it will be understood by those skilled in the art that various changes and modifications may be made therein without departing from the invention. It is aimed, therefore, in the appended claims to cover all such changes and modifications which fall within the true spirit and scope of the invention.

What is claimed is:

1. A device for puncturing pneumatic tires of a vehicle, which device comprises:
   a lineal strip;
   support means secured to said lineal strip comprising a plurality of bolt means spaced along the lengths thereof with the body thereof projecting upwardly therefrom
   a plurality of sharpened, hollow, nail-like members detachably positioned with the hollow portions receiving the body of the bolt means so the sharpened end of each nail-like member will extend upward therefrom; and,
   said lineal strip adapted to be positioned on a roadway with the sharpened, hollow, nail-like members extending upwardly such that the hollow nail-like members will be received by a pneumatic tire passing thereover to provide an escape valve for the air therein and the nail-like members are readily replaced on the support means.

2. The device of claim 1 wherein the nail-like members and bolt means are inclined at an angle toward the oncoming traffic.

3. The device of claim 1 wherein the plurality of sharpened, hollow, nail-like members and bolt means are arranged in staggered relation on said lineal strip.

* * * * *